(12) United States Patent
Jayaraman et al.

(10) Patent No.: US 10,127,134 B2
(45) Date of Patent: Nov. 13, 2018

(54) SOFTWARE TESTING SYSTEM AND A METHOD FOR FACILITATING STRUCTURED REGRESSION PLANNING AND OPTIMIZATION

(71) Applicant: Wipro Limited, Bangalore (IN)

(72) Inventors: Venkata Subramanian Jayaraman, Chennai (IN); Sumithra Sundaresan, Chennai (IN)

(73) Assignee: Wipro Limited, Bangalore (IN)

( * ) Notice: Subject to any disclaimer, the term of this patent is extended or adjusted under 35 U.S.C. 154(b) by 51 days.

(21) Appl. No.: 15/359,264

(22) Filed: Nov. 22, 2016

(65) Prior Publication Data

US 2018/0095859 A1    Apr. 5, 2018

(30) Foreign Application Priority Data

Sep. 30, 2016  (IN) .............................. 201641033586

(51) Int. Cl.
*G06F 11/36* (2006.01)

(52) U.S. Cl.
CPC ........ *G06F 11/3604* (2013.01); *G06F 11/368* (2013.01)

(58) Field of Classification Search
CPC ............. G06F 9/44589; G06F 11/3688; G06F 11/3684
USPC ....................................................... 717/126
See application file for complete search history.

(56) References Cited

U.S. PATENT DOCUMENTS

| | | | |
|---|---|---|---|
| 8,538,767 B1 * | 9/2013 | Hemmat | G06Q 10/06 705/1.1 |
| 8,631,384 B2 | 1/2014 | Marella | |
| 8,793,656 B2 | 7/2014 | Huang et al. | |
| 8,997,052 B2 * | 3/2015 | Bhagavatula | G06F 11/3684 717/124 |
| 2004/0059615 A1 * | 3/2004 | Byrer | G06Q 10/06 705/7.12 |
| 2012/0030651 A1 | 2/2012 | Kemmler | |
| 2012/0042302 A1 | 2/2012 | Sikandar et al. | |
| 2014/0325480 A1 | 10/2014 | Bhagavatula | |
| 2017/0272319 A1 * | 9/2017 | Sheen | H04W 24/10 |
| 2018/0189171 A1 * | 7/2018 | Jowett | G06F 11/3664 |

* cited by examiner

*Primary Examiner* — John Q Chavis
(74) *Attorney, Agent, or Firm* — LeClairRyan PLLC

(57) ABSTRACT

Devices and methods for identifying relevant features of software product are described. The system retrieves requirement data, test case data and defect data associated with plurality of features of the software product. The requirement data comprises de-scoped requirements which indicate those requirements which are not required for performing the regression testing. The device further computes an impact score, a test effort score, and a weightage factor for each of the plurality of features based on the requirement data, the test case data and the defect data respectively. Based on the computed impact score, the test effort score, and the weightage factor, the device further determines a regression factor for each of the plurality of features. Further, the device identifies one or more relevant features amongst the plurality of features based on the regression factor. This way, the device facilitates structured regression planning which optimizes the overall performance of the device.

18 Claims, 4 Drawing Sheets

SOFTWARE TESTING SYSTEM AND A METHOD FOR FACILITATING STRUCTURED REGRESSION PLANNING AND OPTIMIZATION

This application claims the benefit of Indian Patent Application Serial No. 201641033586 filed Sep. 30, 2016 which is hereby incorporated by reference in its entirety.

FIELD

The present disclosure relates in general to software testing. More particularly, but not exclusively, the present disclosure discloses a system and method for facilitating structured regression planning and optimization for software testing.

BACKGROUND

Software testing serves as one of an important phase in a software production lifecycle. Once the software or software products (e.g., software applications/tools) are done with the development phase, the next task is to test the developed software. As conventionally known that testing is done to check whether the functionalities or features of the software are working in similar manner as they are intended to work. Not only the newly developed software is tested, but existing software products are also tested when there are some enhancement or changes occurred in their functionalities/features.

One of the types of software testing is a regression testing. The regression testing is performed when there is change in code of the software product. In other words, when the existing software product is enhanced or altered by adding new features or modifying existing ones, then the regression testing is performed in order to ensure that existing functionalities of the software product is not impacted. However, sometimes it becomes difficult to determine to what extent the regression testing has to be performed. It may happen that changes done in one of major feature of a particular software product may affect other features of that same software product. Then, in this scenario, it becomes a challenge to determine which features should be tested and which features should be not. The above challenge sometimes leads to conclusion to run the regression test upon all the features which are likely to be affected due to changes in other features.

Thus, the testing of all the features, irrespective of their relevance, ultimately results in overload on computing systems or devices performing the regression testing. Due to overload, the consumption of internal resources of the computing systems and devices are unnecessarily increased which affects the performance of the computing system.

SUMMARY

Disclosed herein is a method and system for identifying relevant features of a software product for regression testing. Once the changes in features of the software product are done, then it becomes important to locate all the relevant features which are to be considered for the regression testing. For this, various types of data associated with the software product may be retrieved, for example, requirement data, test case data and defect data. Based on the retrieved data, different corresponding scores may be computed. The scores reflect the significance of each of the retrieved data. Further, the scores are used for determining a quantitative value which helps in locating the aforesaid relevant features.

Accordingly, the present disclosure relates to a method for identifying relevant features of a software product for regression testing. The method may comprise the step of retrieving requirement data, test case data and defect data associated with a plurality of features of the software product. The requirement data may comprise at least one of one or more new requirements, one or more updated requirements, one or more impacted requirements, and one or more de-scoped requirements. Further, the de-scoped requirements indicate a set of requirements not required for performing the regression testing. The method may further comprise computing an impact score, a test effort score, and a weightage factor for each of the plurality of features based on the requirement data, the test case data and the defect data, respectively. The impact score is computed by excluding the one or more de-scoped requirements from the one or more new requirements, the one or more updated requirements, and the one or more impacted requirements. Further, the method may comprise a step of determining a regression factor for each of the plurality of features based on the impact score, the test effort score, and the weightage factor. The method may further comprise identifying one or more relevant features amongst the plurality of features based on the regression factor.

Further, the present disclosure relates to a software testing system for identifying relevant features of a software product for regression testing. The software testing system comprises a processor and a memory communicatively coupled to the processor. The memory stores processor-executable instructions, which, on execution, causes the processor to perform one or more operations comprising retrieving requirement data, test case data and defect data associated with a plurality of features of the software product. The requirement data may comprise at least one of one or more new requirements, one or more updated requirements, one or more impacted requirements, and one or more de-scoped requirements. Further, the de-scoped requirements indicate a set of requirements not required for performing the regression testing. The system may further compute an impact score, a test effort score, and a weightage factor for each of the plurality of features based on the requirement data, the test case data and the defect data, respectively. The impact score is computed by excluding the one or more de-scoped requirements from the one or more new requirements, the one or more updated requirements, and the one or more impacted requirements. Further, the system may determine a regression factor for each of the plurality of features based on the impact score, the test effort score, and the weightage factor. The system may further identify one or more relevant features amongst the plurality of features based on the regression factor.

Furthermore, the present disclosure relates to a non-transitory computer readable medium including instructions stored thereon that when processed by at least one processor may cause a software testing system to perform the acts of retrieving requirement data, test case data and defect data associated with a plurality of features of the software product. The requirement data comprises at least one of one or more new requirements, one or more updated requirements, one or more impacted requirements, and one or more de-scoped requirements. The de-scoped requirements indicate a set of requirements not required for performing the regression testing. The software testing system may further compute an impact score, a test effort score, and a weightage factor for each of the plurality of features based on the requirement data, the test case data and the defect data, respectively. The impact score is computed by excluding the one or more de-scoped requirements from the one or more new requirements, the one or more updated requirements, and the one or more impacted requirements. Further, the software testing system may determine a regression factor for each of the plurality of features based on the impact score, the test effort score, and the weightage factor. The software testing system may further identify one or more relevant features amongst the plurality of features based on the regression factor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
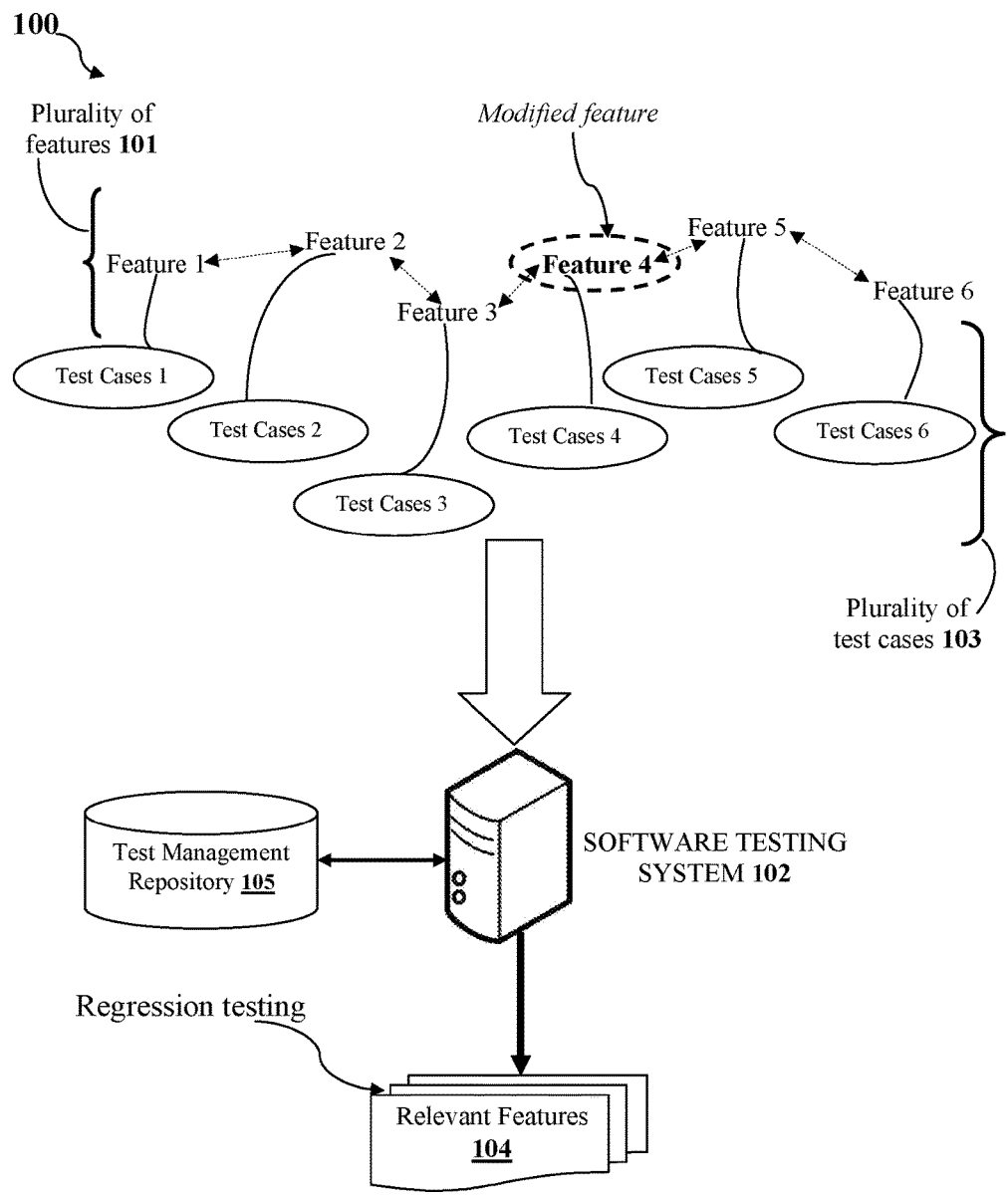
FIG. 1 shows an exemplary environment illustrating a software testing system for identifying relevant features of a software product for regression testing in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a software testing system (alternatively also referred as "system") for identifying relevant features of a software product for regression testing. Although, the method for identifying relevant features is described in conjunction with a server, the said method can also be implemented in various computing systems/devices, other than the server. The software product comprises various features, wherein the features are present in a form of software codes. Many of these features are associated with each other in the sense that, a change in one feature may affect the functionality of other associated features. The change in the features are witnessed when a new version of the software product is released. The newer version of the software product comes with improved functionalities of their various features. However, these improved functionalities need to be re-tested to verify whether the functionalities are still working as expected before heading to production stage of software product.

The re-testing of the features is called as regression testing which is one of a type of the software testing. The purpose of performing the regression testing is not limited to check only functionalities of the modified feature, but it also ensures that the modified features do not have any negative affect on other features associated with the modified feature. For this, a plurality of features have to be considered during the regression testing. However, many a times, it has been realized while performing the regressing testing that all the associated features are not necessarily required for the testing. This is because, it may happen that some of the associated features may not be affected to such an extent for which the regression testing is needed. These unaffected features need to be removed from the list of features for which regression testing has to be performed.

The primary reason behind removing those unaffected features is that lot of time and effort is wasted while performing the regression testing. For performing the testing, the system utilizes its own internal hardware components like processor, memory, application specific integrated circuits (ASIC) and other hardware resources. More the number of features to be tested, more will be the utilization of the hardware components/resources of the system.

Thus, the present disclosure focuses on identifying only relevant features which are actually required for performing the regression testing. For identifying relevant features, the present disclosure performs a feature-level analysis. This means that all the parameters associated with the features like requirement details, test cases, and defects information are considered by the system which is explained in detail in subsequent paragraphs of the specification.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a software testing system for identifying relevant features of a software product for regression testing.

The environment 100 comprises a plurality of features 101, a plurality of test cases 103, the software testing system 102, relevant features 104, and test management repository 105. The plurality of features 101 are associated with the software product, whereas, the plurality of test cases is associated with corresponding features. For example, "Feature 1" comprises Test cases 1 and "Feature 2" comprises Test cases 2. Similarly, the other test cases i.e., Test case 3, Test case 4, Test case 5, and Test case 6 are associated with their corresponding features Feature 3, Feature 4, Feature 5, and Feature 6, respectively. The test cases may be retrieved from the test management repository 105. As an example, the software product may be a health application. The plurality of features associated with the software product i.e., the health application may be, monitoring health of an individual, providing suggestions when the health of an individual is not fine, indicating to one or more other users who are related to the individual about the health of the individual, and the like. To check whether each of these features are working correctly, one or more test cases are implemented for testing these features.

As an example shown in the FIG. 1, the Feature 4 (shown inside a dotted circle) is modified when the new version of the software product is released. Then, the software testing system 102 analyses all the features associated with the Feature 4 in order to identify one or more relevant features 104 to be considered for performing the regression testing. For example, the software testing system 102 may identify Feature 3 and Feature 5 as the relevant features for performing the regression testing.

In an embodiment, the software testing system 102 may include, but not limited to, a server, a computer, a workstation, a laptop, mobile phone, or any computing system/device capable of receiving, analysing and processing the useful information.

Figure 2:
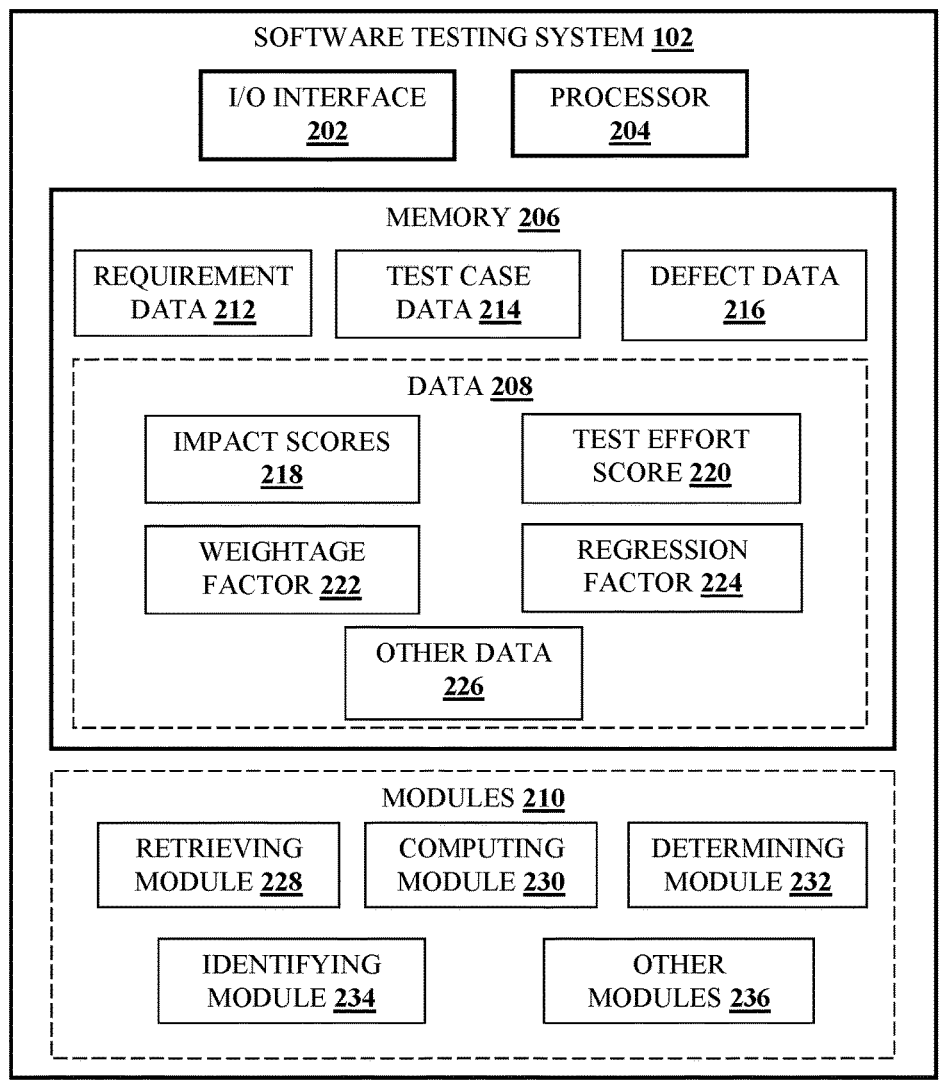
FIG. 2 shows a detailed block diagram illustrating the software testing system in accordance with some embodiments of the present disclosure.

FIG. 2 shows a detailed block diagram illustrating the software testing system in accordance with some embodiments of the present disclosure.

The software testing system 102 comprises an I/O interface 202, a processor 204 and a memory 206. The memory 206 is communicatively coupled to the processor 204. The processor 204 is configured to perform one or more functions of the software testing system 102 for identifying the relevant features. In one implementation, the software testing system 102 comprises data 208 and modules 210 for performing various operations in accordance with the embodiments of the present disclosure. The memory 206 further comprises requirement data 212, test case data 214, and defect data 216 retrieved from the test management repository 105. In an embodiment, the data 208 may include, without limitation, an impact score 218, test effort score 220, weightage factor 222, regression factor 224, and other data 226.

In one embodiment, the data 208 may be stored within the memory 206 in the form of various data structures. Additionally, the aforementioned data 208 can be organized using data models, such as relational or hierarchical data models. The other data 226 may store data, including temporary data and temporary files, generated by modules 210 for performing the various functions of the software testing system 102.

In an embodiment, the data 208 may be processed by one or more modules 210. In one implementation, the one or more modules 210 may also be stored as a part of the processor 204. In an example, the one or more modules 210 may be communicatively coupled to the processor 204 for performing one or more functions of the software testing system 102.

In one implementation, the one or more modules 210 may include, without limitation, a retrieving module 228, a computing module 230, a determining module 232, an identifying module 234, and other modules 236. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the retrieving module 228 may retrieve the requirement data 212, the test case data 214 and the defect data 216 associated with a plurality of features of the software product. All these data are retrieved from the test management repository 105. According to embodiments, the test management repository 105 may be either external or internal to the software testing system 102. The requirement data 212 may comprise at least one of one or more new requirements, one or more updated requirements, one or more impacted requirements, and one or more de-scoped requirements. The one or more updated requirements indicate those requirements that undergo changes because of defect identified or changes in the scope. The one or more impacted requirements indicate those requirements which are expected to be impacted because of the new changed requirements. These requirements (impacted) may be in a form of parent-child relationship. Further, the one or more de-scoped requirements indicates a set of requirements not required for performing the regression testing. The requirement data 212 also comprises existing requirements. An example of the requirement data 212 retrieved from the test management repository 105 is shown in below table 1.

TABLE 1

Requirement Data

| Features | Product Areas | Existing require-ments | New require-ments | Updated require-ments | Impacted require-ments | De-scoped require-ments |
|---|---|---|---|---|---|---|
| Feature 1 (Product listing) | Product Management | 60 | 5 | 25 | 5 | 10 |
| Feature 2 (Login) | User Management | 10 | 4 | 3 | 3 | 0 |
| Feature 3 (Price Display) | Price Management | 20 | 5 | 5 | 10 | 0 |
| Feature 4 (User profile) | User Management | 8 | 2 | 2 | 5 | 1 |

From the above table 1 it can be observed that there are four different features (Product listing, Login, Price Display, User profile) in different product areas of the software product is listed for which the requirement data 212 is retrieved. For example, the maximum existing requirements retrieved is for feature 1 i.e., the Product listing, whereas, on the other hand, the minimum existing requirements retrieved is associated with feature 4 i.e., User Profile. It can be also observed that feature 1 has maximum number of updated and de-scoped requirements i.e., 25 and 10 respectively.

Typically, the requirement data 212 are 'user-stories' or in other words, brief description of customer-relevant functionalities. Thus, the requirement data 212 provides detailed insight and helps the system 102 to understand the importance level of the features from customer's perspective.

Further, the test case data 214 may comprise one or more existing test cases, one or more new test cases, one or more updated test cases, and one or more deleted test cases based on the de-scoped requirements. The one or more new test cases corresponds to new requirements, whereas, the one or more updated test cases corresponds to the updated requirements. An example of the test case data 214 retrieved from the test management repository 105 is shown in below table 2.

TABLE 2

Test Case Data

| Features | Existing test cases | New test cases | Updated test cases | Deleted test cases |
|---|---|---|---|---|
| Feature 1 (Product listing) | 200 | 20 | 125 | 50 |
| Feature 2 (Login) | 20 | 4 | 2 | 0 |
| Feature 3 (Price Display) | 100 | 8 | 5 | 5 |
| Feature 4 (User profile) | 30 | 8 | 1 | 0 |

From the above table 2, it can be observed that feature 1 (Product listing) has maximum number of existing test cases, whereas feature 4 (User profile) has minimum number of existing test cases. The test cases status provided in the test case data 214 helps the system 102 to estimate effort required for executing the test cases corresponding to each features. This analysis of the effort estimation again helps in determining the importance level of the features before considering them for the regression testing.

Further, the defect data 216 may comprise one or more user acceptance testing defect data indicating defect detected during user acceptance testing (UAT), one or more production defect data indicating defect detected in production stage, and one or more quality assurance defect data indicating defect detected in quality assurance stage. An example of the defect data 216 retrieved from the test management repository 105 is shown in below table 3.

TABLE 3

Defect Data

| Features | Priority of New Features (1 - Low, 2 - Med, 3 - High) | No of defects found earlier in Quality assurance (QA) for the features (for predefined time, for example - last 6 months) | No of defects found in User Acceptance Testing (UAT) for the features (for predefined time, for example - last 6 months) | No of Production defects found for the feature (for predefined time, for example - last 6 months) |
|---|---|---|---|---|
| Feature 1 (Product listing) | 3 | 20 | 3 | 1 |
| Feature 2 (Login) | 1 | 1 | 1 | 0 |
| Feature 3 (Price Display) | 3 | 3 | 2 | 0 |
| Feature 4 (User profile) | 2 | 1 | 0 | 1 |

From the above table 3, it can be observed that a priority of each of the plurality of features is determined based on the one or more user acceptance testing defect data, the one or more production defect data, and the one or more quality assurance defect data. For example, since the number of defects found during quality assurance is highest for the Feature 1, this feature is set on highest priority. The prioritization of the features based on the defect data 216 also contribute in understanding the importance level of the features.

Now, after retrieving the aforementioned data (i.e., requirement data, test case data, and defect data), the computing module 230 may compute an impact score 218, a test effort score 220, and a weightage factor 222 for each of the plurality of features based on the requirement data 212, the test case data 214 and the defect data 216 respectively. Each of these computations are explained below in detail. For example, the impact score 218 is computed by considering the requirement data 212 from table 1 and using following expression:

Impact Score=((Existing requirements+(2*Newly added requirements)+Updated requirements+ Impacted Requirements)−De-scoped Requirements)

Thus, based on the above expression, the impact score computed is shown in last column of below table 4.

TABLE 4

Impact Score

| Features | Existing requirements | New requirements | Updated requirements | Impacted requirements | De-scoped requirements | Impact Score |
|---|---|---|---|---|---|---|
| Feature 1 (Product listing) | 60 | 5 | 25 | 5 | 10 | (60 + (2 * 5) + 25 + 5) − 10) = 90 |
| Feature 2 (Login) | 10 | 4 | 3 | 3 | 0 | 24 |
| Feature 3 (Price Display) | 20 | 5 | 5 | 10 | 0 | 45 |
| Feature 4 (User profile) | 8 | 2 | 2 | 5 | 1 | 18 |

As can be observed from the above table 4 that the impact score is computed by excluding the one or more de-scoped requirements from the one or more new requirements, the one or more updated requirements, and the one or more impacted requirements.

From the above table 4, it can be observed that feature 1 (Product listing) has the highest impact score, whereas, feature 4 (User Profile) has the lowest impact score.

Further, the test effort score 220 is computed by considering the test case data 214 from table 2 and using following expression:

Test Effort Score=(New test cases+(Updated test cases/2)+(Deleted test cases/4))

The above expression is framed considering the fact that new test cases may take maximum time, whereas, updated test cases may normally take only half of the time. It is also considered that deleting the test cases after analyzing may take one-fourth of the time. Thus, based on the above expression, the test case score 220 computed is shown in last column of below table 5.

TABLE 5

Test Effort Score

| Features | Existing test cases | New test cases | Updated test cases | Deleted test cases | Test Effort Score |
|---|---|---|---|---|---|
| Feature 1 (Product listing) | 200 | 20 | 125 | 50 | (20 + (125/2) + (50)) = 95 |
| Feature 2 (Login) | 20 | 4 | 2 | 0 | 5 |
| Feature 3 (Price Display) | 100 | 8 | 5 | 5 | 11.75 |
| Feature 4 (User profile) | 30 | 8 | 1 | 0 | 8.5 |

From the above table 5, it can be observed that feature 1 (Product listing) has the highest test effort score, whereas, feature 2 has the lowest one.

Further, the weightage factor 222 is computed by considering the defect data 216 from table 3 and using following expression:

Weightage Factor=((Number of QA defects+(2*UAT defects)+(3*Production Defects))*3

Thus, based on the above expression, the weightage factor 222 computed is shown in last column of below table 6.

TABLE 6

Weightage Factor

| Features | Priority of New Features (1 - Low, 2 - Med, 3 - High) | No of defects found earlier in Quality assurance (QA) for the feature (for predefined time, for example - last 6 months) | No of defects found in User Acceptance Testing (UAT) for the feature (for predefined time, for example - last 6 months) | No of Production defects found for the feature (for predefined time, for example - last 6 months) | Weightage factor |
|---|---|---|---|---|---|
| Feature 1 (Product listing) | 3 | 20 | 3 | 1 | (20 + (2 * 3) + (3 * 1) * 3) = 87 |
| Feature 2 (Login) | 1 | 1 | 1 | 0 | 9 |
| Feature 3 (Price Display) | 3 | 3 | 2 | 0 | 21 |
| Feature 4 (User profile) | 2 | 1 | 0 | 1 | 12 |

From the above table 6, it can be observed that the feature 1 (Product listing) has the highest weightage factor and feature 2 (Login) has the lowest one.

Now, once all the computation is performed by the computing module 230, the next step is to determine an overall impact of the above computed scores (i.e., impact scores, test effort score, and weightage actor). For this, the determining module 232 may determine a regression factor 224 based on the impact score 218, the test effort score 220, and a weightage factor 222 as shown in the tables 4, 5, and 6 respectively. The determination of the regression factor 224 is based on the below formulated expression:

Regression Factor=((Weightage Factor+Test Effort Score)/Impact Score)

Thus, by using the above expression, the regression factor 224 determined by the determining module 232 is shown in last column of below table 7.

TABLE 7

Regression Factor

| Features | Impact Score | Weightage Factor | Test Effort Score | Regression Factor |
|---|---|---|---|---|
| Feature 1 (Product listing) | 90 | 87 | 95 | ((87 + 95)/90) = 2.0222222222 |
| Feature 2 (Login) | 24 | 9 | 5 | 0.5833333333 |
| Feature 3 (Price Display) | 45 | 21 | 11.75 | 0.7277777778 |
| Feature 4 (User profile) | 18 | 12 | 8.5 | 1.1388888889 |

The regression factor 224 determined helps the system 102 in planning overall regression testing strategy in order to optimize the regression testing. As explained above, the focus of present disclosure is to eliminate un-relevant features while performing the regression testing. In other words, the system's 102 approach is to identify only the relevant features for testing. For this, the identifying module 234, of the system 102, may identify the relevant features from the plurality of features based on the regression factor 224 determined. The identifying module 234 may compare the regression factor of each of the plurality of features with a predefined regression factor range as shown below.

Regression Factor>3—The Feature is highest contender for regression testing

Regression Factor is between 0 and 3—The Feature is medium contender for regression testing Regression Factor<0—The Feature is low contender for regression testing.

From the above ranges and their results, it is observed that higher the regression factor 224, more chances of automation. This way, only the relevant features are selected for performing the regression testing, thereby optimizing the processing of the system 102.

Figure 3:
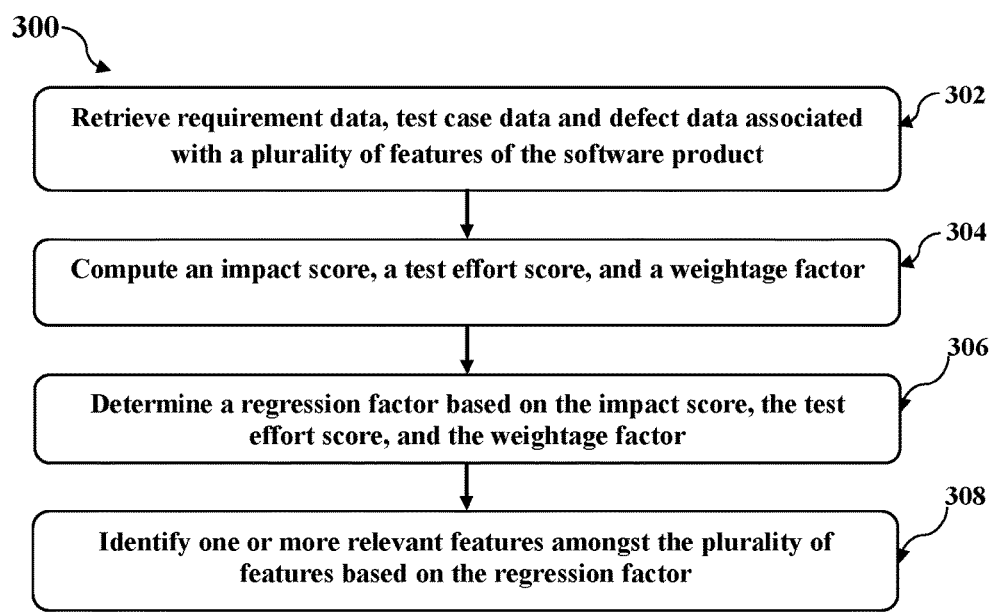
FIG. 3 shows a flowchart illustrating a method of identifying relevant features of a software product for regression testing in accordance with some embodiments of the present disclosure.

FIG. 3 shows a flowchart illustrating a method for identifying relevant features of a software product for regression testing with some embodiments of the present disclosure.

As illustrated in FIG. 3, the method 300 comprises one or more blocks for identifying relevant features of a software product using a software testing system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the software testing system 102 may retrieve requirement data, test case data and defect data associated with a plurality of features of the software product. The requirement data may comprise at least one of one or more new requirements, one or more updated requirements, one or more impacted requirements and one or more de-scoped requirements. Further, the de-scoped requirements indicate a set of requirements not required for performing the regression testing.

At block 304, the software testing system 102 may compute an impact score, a test effort score, and a weightage factor for each of the plurality of features based on the requirement data, the test case data and the defect data, respectively. The impact score is computed by excluding the one or more de-scoped requirements from the one or more new requirements, the one or more updated requirements, and the one or more impacted requirements.

At block 306, the software testing system 102 may determine a regression factor for each of the plurality of features based on the impact score, the test effort score, and the weightage factor.

At block 308, the software testing system 102 may identify one or more relevant features amongst the plurality of features based on the regression factor.

Computer System

Figure 4:
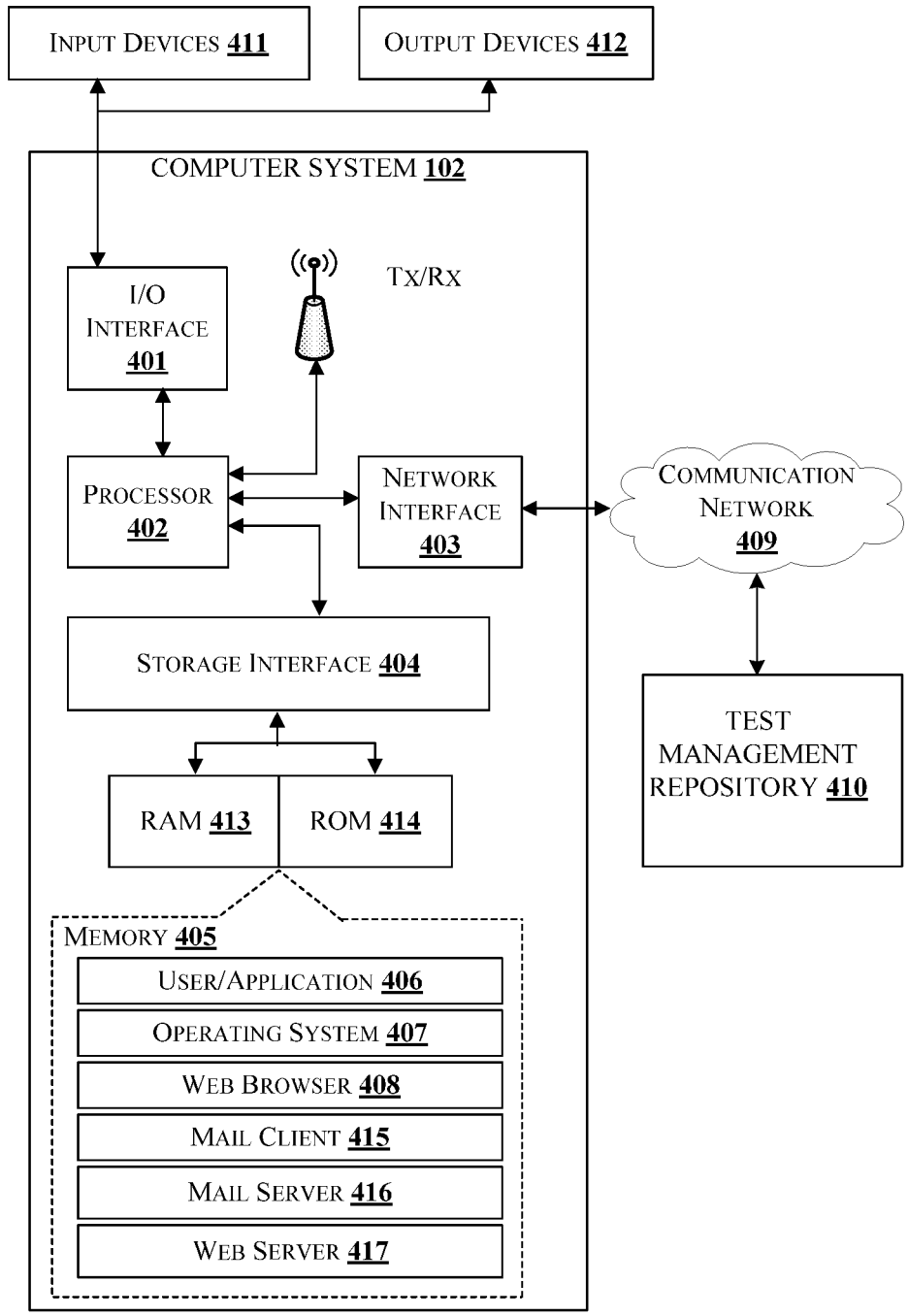
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the software testing system 102 which is used for identifying relevant features of a software product for regression testing. The data such as requirement data 212, test case data 214, and defect data 216 may be retrieved from a test management system 410 communicatively coupled with the computer system 400. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/ 7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method for facilitating structured regression planning for performing the software testing.

In an embodiment, the method of present disclosure provides feature-level consideration while identifying the relevant features.

In an embodiment, the present disclosure provides a method for optimizing the system's performance while performing the software testing.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | ENVIRONMENT |
| 101 | PLURALITY OF FEATURES |
| 102 | SOFTWARE TESTING SYSTEM |
| 103 | PLURALITY OF TEST CASES |
| 104 | RELEVANT FEATURES |

-continued

| Reference Number | Description |
| --- | --- |
| 105 | TEST MANAGEMENT REPOSITORY |
| 202 | I/O INTERFACE |
| 204 | PROCESSOR |
| 206 | MEMORY |
| 208 | DATA |
| 210 | MODULES |
| 212 | REQUIREMENT DATA |
| 214 | TEST CASE DATA |
| 216 | DEFECT DATA |
| 218 | IMPACT SCORES |
| 220 | TEST EFFORT SCORE |
| 222 | WEIGHTAGE SCORE |
| 224 | REGRESSION FACTOR |
| 226 | OTHER DATA |
| 228 | RETRIEVING MODULE |
| 230 | COMPUTING MODULE |
| 232 | DETERMINING MODULE |
| 234 | IDENTIFYING MODULE |
| 236 | OTHER MODULES |

What is claimed is:

1. A method for identifying relevant features of a software product for regression testing, the method comprising:
   retrieving, by a software testing computing device, requirement data, test case data and defect data associated with a plurality of features of the software product, wherein the requirement data comprises one or more new requirements, one or more updated requirements, one or more impacted requirements, and one or more de-scoped requirements, and wherein the de-scoped requirements indicates a set of requirements not required for performing the regression testing;
   computing, by the software testing computing device, an impact score, a test effort score, and a weightage factor for each of the plurality of features based on the requirement data, the test case data and the defect data respectively, wherein the impact score is computed by excluding the one or more de-scoped requirements from the one or more new requirements, and adding the one or more updated requirements with the one or more impacted requirements;
   determining, by the software testing computing device, a regression factor for each of the plurality of features based on the impact score, the test effort score, and the weightage factor;
   identifying, by the software testing computing device, one or more relevant features amongst the plurality of features based on the regression factor; and
   testing, by the software testing computing device, only the identified one or more relevant features of the software product.

2. The method as claimed in claim 1, wherein the requirement data, the test case data and the defect data are retrieved from a test management repository associated with the software testing computing device.

3. The method as claimed in claim 1, wherein test case data comprises one or more existing test cases, one or more new test cases, one or more updated test cases, and one or more deleted test cases based on the de-scoped requirements.

4. The method as claimed in claim 1, wherein the defect data comprises one or more user acceptance testing defect data indicating defect detected during user acceptance testing, one or more production defect data indicating defect detected in production stage, and one or more quality assurance defect data indicating defect detected in quality assurance stage.

5. The method as claimed in claim 4, further comprising determining a priority of each of the plurality of features based on the one or more user acceptance testing defect data, the one or more production defect data, and the one or more quality assurance defect data.

6. The method as claimed in claim 1, wherein the identifying the one or more relevant features comprises:
   comparing, by the software testing computing device, the regression factor of each of the plurality of features with a predefined regression factor range.

7. A software testing computing device comprising:
   a processor; and
   a memory communicatively coupled to the processor, wherein the memory stores processor-executable instructions, which, on execution, causes the processor to:
      retrieve requirement data, test case data and defect data associated with a plurality of features of the software product, wherein the requirement data comprises one or more new requirements, one or more updated requirements, one or more impacted requirements and one or more de-scoped requirements, and wherein the de-scoped requirements indicate a set of requirements not required for performing the regression testing;
      compute an impact score, a test effort score, and a weightage factor for each of the plurality of features based on the requirement data, the test case data and the defect data respectively, wherein the impact score is computed by excluding the one or more de-scoped requirements from the one or more new requirements, and adding the one or more updated requirements with the one or more impacted requirements;
      determine a regression factor for each of the plurality of features based on the impact score, the test effort score, and the weightage factor;
      identify one or more relevant features amongst the plurality of features based on the regression factor; and
      test only the identified one or more relevant features of the software product.

8. The device as claimed in claim 7, wherein the requirement data, the test case data and the defect data are retrieved from a test management repository associated with the software testing system.

9. The device as claimed in claim 7, wherein test case data comprises one or more existing test cases, one or more new test cases, one or more updated test cases, and one or more deleted test cases based on the de-scoped requirements.

10. The device as claimed in claim 7, wherein the defect data comprises one or more user acceptance testing defect data indicating defect detected during user acceptance testing, one or more production defect data indicating defect detected during production stage, and one or more quality assurance defect data indicating defect detected during quality assurance stage.

11. The device as claimed in claim 10, wherein the processor is further configured to determine priority of each of the plurality of features based on the one or more user acceptance testing defect data, the one or more production defect data, and the one or more quality assurance defect data.

12. The device as claimed in claim 7, wherein the processor is further configured to identify the one or more relevant features by comparing the regression factor of each of the plurality of features with a predefined regression factor range.

13. A non-transitory computer-readable storage medium including instructions stored thereon that when processed by at least one processor cause a software testing system to perform operations comprising:
- retrieving requirement data, test case data and defect data associated with a plurality of features of the software product, wherein the requirement data comprises one or more new requirements, one or more updated requirements, one or more impacted requirements, and one or more de-scoped requirements, and wherein the de-scoped requirements indicates a set of requirements not required for performing the regression testing;
- computing an impact score, a test effort score, and a weightage factor for each of the plurality of features based on the requirement data, the test case data and the defect data respectively, wherein the impact score is computed by excluding the one or more de-scoped requirements from the one or more new requirements, and adding the one or more updated requirements with the one or more impacted requirements;
- determining a regression factor for each of the plurality of features based on the impact score, the test effort score, and the weightage factor;
- identifying one or more relevant features amongst the plurality of features based on the regression factor; and
- testing only the identified one or more relevant features of the software product.

14. The medium as claimed in claim 13, wherein the requirement data, the test case data and the defect data are retrieved from a test management repository associated with the software testing system.

15. The medium as claimed in claim 13, wherein test case data comprises one or more existing test cases, one or more new test cases, one or more updated test cases, and one or more deleted test cases based on the de-scoped requirements.

16. The medium as claimed in claim 13, wherein the defect data comprises one or more user acceptance testing defect data indicating defect detected during user acceptance testing, one or more production defect data indicating defect detected in production stage, and one or more quality assurance defect data indicating defect detected in quality assurance stage.

17. The medium as claimed in claim 16, wherein the instructions further cause the at least processor to determine a priority of each of the plurality of features based on the one or more user acceptance testing defect data, the one or more production defect data, and the one or more quality assurance defect data.

18. The medium as claimed in claim 13, wherein the identifying the one or more relevant features comprises:
- comparing the regression factor of each of the plurality of features with a predefined regression factor range.

* * * * *